United States Patent
Downey et al.

(10) Patent No.: US 9,537,521 B2
(45) Date of Patent: Jan. 3, 2017

(54) SYSTEM FOR AND METHOD OF REMOVING UNWANTED INBAND SIGNALS FROM A RECEIVED COMMUNICATION SIGNAL

(71) Applicant: Glowlink Communications Technology, Inc., Los Altos, CA (US)

(72) Inventors: Michael L. Downey, Livermore, CA (US); Jeffrey C. Chu, Los Altos, CA (US)

(73) Assignee: Glowlink Communications Technology, Inc., Los Altos, CA (US)

(*) Notice: Subject to any disclaimer, the term of this patent is extended or adjusted under 35 U.S.C. 154(b) by 636 days.

(21) Appl. No.: 14/057,891

(22) Filed: Oct. 18, 2013

(65) Prior Publication Data

US 2016/0226537 A1    Aug. 4, 2016

Related U.S. Application Data

(63) Continuation-in-part of application No. 13/778,079, filed on Feb. 26, 2013, now Pat. No. 8,929,492, which is a continuation-in-part of application No. 12/753,644, filed on Apr. 2, 2010, now Pat. No. 8,433,015.

(60) Provisional application No. 61/266,312, filed on Dec. 3, 2009.

(51) Int. Cl.
| | |
|---|---|
| *H04B 1/10* | (2006.01) |
| *H04B 1/12* | (2006.01) |
| *H04J 11/00* | (2006.01) |
| *H04L 1/00* | (2006.01) |
| *H04L 25/03* | (2006.01) |

(52) U.S. Cl.
CPC ............ *H04B 1/123* (2013.01); *H04B 1/1027* (2013.01); *H04J 11/004* (2013.01); *H04L 1/0036* (2013.01); *H04L 25/03057* (2013.01)

(58) Field of Classification Search
CPC ....... H04B 1/123; H04B 1/1027; H04B 1/109; H04L 1/0036
USPC ........................................ 375/346, 349, 350
See application file for complete search history.

(56) References Cited

U.S. PATENT DOCUMENTS

| | | | |
|---|---|---|---|
| 7,054,378 B2 | 5/2006 | Walton et al. | |
| 7,426,246 B2 | 9/2008 | Chen et al. | |
| 7,639,761 B2 | 12/2009 | Chu et al. | |
| 7,885,314 B1 | 2/2011 | Walley et al. | |
| 8,433,015 B2 | 4/2013 | Downey et al. | |

(Continued)

OTHER PUBLICATIONS

PCT International Search Report and Written Opinion, PCT/US2010/55883, dated Jan. 18, 2011.

(Continued)

*Primary Examiner* — David S Huang
(74) *Attorney, Agent, or Firm* — Westberg Law Offices

(57) ABSTRACT

A system for and method of removing one or more unwanted inband signals from a received communications signal is described. The inband signal or signals may comprise noise, interference signals, or any other unwanted signals that impact the quality of the underlying communications. A signal attenuator is configured to selectively attenuate the one or more unwanted inband signals to form a modified received signal that includes the desired communication signal and the attenuated inband signals. A signal separator processes the modified received signal to form an estimate of the desired communication signal and an estimate of the inband signals.

30 Claims, 7 Drawing Sheets

(56) References Cited

U.S. PATENT DOCUMENTS

| | | |
|---|---|---|
| 2003/0012313 A1 | 1/2003 | Husted et al. |
| 2003/0035491 A1 | 2/2003 | Walton et al. |
| 2004/0086137 A1 | 5/2004 | Yu et al. |
| 2005/0239509 A1 | 10/2005 | Li et al. |
| 2006/0253765 A1 | 11/2006 | Boer et al. |
| 2007/0184811 A1* | 8/2007 | Ballantyne ............ H04B 1/109 455/343.2 |
| 2007/0216572 A1* | 9/2007 | Schnabel ................ G01S 19/02 342/357.395 |
| 2008/0144485 A1* | 6/2008 | Matsumoto ............ G01S 19/21 370/201 |
| 2008/0144709 A1 | 6/2008 | McCallister et al. |
| 2008/0153448 A1 | 6/2008 | Murakami |
| 2009/0225913 A1 | 9/2009 | Nakahara et al. |
| 2009/0245438 A1 | 10/2009 | Oredsson et al. |
| 2010/0046672 A1 | 2/2010 | Chu et al. |
| 2010/0104039 A1 | 4/2010 | Ketchum et al. |
| 2011/0305306 A1 | 12/2011 | Hu et al. |

OTHER PUBLICATIONS

PCT International Search Report and Written Opinion, PCT/US2014/17519, dated Jun. 17, 2014.

\* cited by examiner

US 9,537,521 B2

SYSTEM FOR AND METHOD OF REMOVING UNWANTED INBAND SIGNALS FROM A RECEIVED COMMUNICATION SIGNAL

This application is a continuation-in-part of U.S. application Ser. No. 13/778,079, filed Feb. 26, 2013, which is a continuation-in-part of U.S. application Ser. No. 12/753,644, filed Apr. 2, 2010 (and issued as U.S. Pat. No. 8,433,015), which claims the benefit of U.S. Provisional Application No. 61/266,312, filed Dec. 3, 2009. The entire contents of all above-mentioned prior applications are hereby incorporated by reference.

FIELD OF THE INVENTION

The invention relates to a novel system for and method of removing unwanted inband signals from a received communication signal, thereby improving the quality of the received communication.

BACKGROUND

Information can be transmitted across distances by encoding the information onto a carrier and transmitting the resulting communication signal across different types of wired or wireless media. At the receiving end, a composite signal is received that includes both the desired communication signal as well as other signals that become added either intentionally or unintentionally to and within the bandwidth of the desired communication signal. These other signals may include noise, interferences or any other undesirable signals, and are generally unwanted because they collectively and individually contribute to the degradation of the quality of the received communication signal. Because they are present within the frequency range (i.e. bandwidth) of the desired communication signal, these other signals are referred to as being "inband."

The quality of a received communication signal, such as that carried on a TV channel or a radio channel, can be expressed as a ratio of carrier power (C) to noise power (N), where C represents the power of the desired received communication signal and N represents the aggregate power of all the unwanted signals present in the bandwidth of the carrier. This invention is directed toward improving the quality of the received communication signal by removing these unwanted signals from the received communication signal.

SUMMARY

A system for and method of removing one or more unwanted inband signals from a received communications signal is described. The inband signal or signals may comprise noise, interference signals, or any other unwanted signals that impact the quality of the underlying communications. A signal attenuator is configured to selectively attenuate the one or more unwanted inband signals to form a modified received signal that includes the desired communication signal and the attenuated inband signals. A signal separator processes the modified received signal to form an estimate of the desired communication signal and an estimate of the inband signals.

DESCRIPTION OF AN EMBODIMENT OF THE INVENTION

Figure 1:
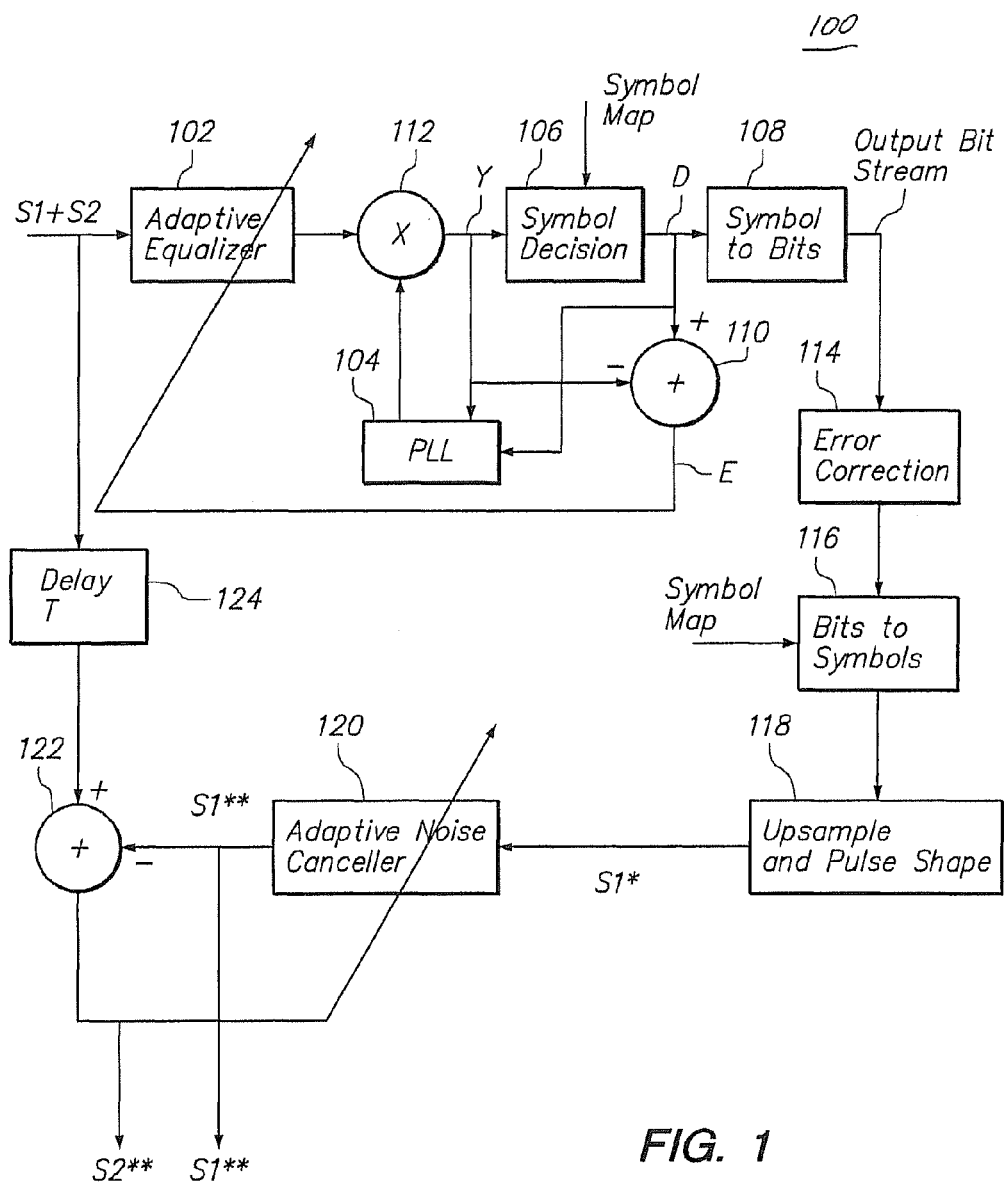
FIG. 1 illustrates a block diagram of an inband signal remover in accordance with an embodiment of the present invention.

We describe a new system and method for removing unwanted inband signals from a received communication signal thereby improving the quality of the communication signal. As used herein, the term "received communication signal" refers to a composite signal that includes both an information bearing communication signal (also referred to as a "desired" communication signal), and other signals that simultaneously occupy the same bandwidth that are either unanticipated or undesired (also referred to as "unwanted" signals). These unwanted signals include noise, interferences and any other inband signal that is not the desired communication signal. These signals are "unwanted" because they collectively and individually contribute to the degradation of the quality of the received communication signal. While undesired out-of-band signals can be readily filtered off by a frequency-selective filter, these inband unwanted signals cannot generally be filtered off. Therefore, the inband signals are more difficult to remove, especially if no prior knowledge of the characteristics of the inband signals are available.

The method does not require prior knowledge of characteristics of the unwanted inband signals, nor does it require a copy of any of the unwanted inband signals to be available from any source other than the composite signal itself. Thus, all processing is conducted solely from the composite received signal, which has both the desired communication signal and the unwanted signals in it. Because of this, random noise can be removed in addition to removing other inband signals, such as interferers.

To help illustrate this invention, consider the following received communication signal $$S = C + I1 + I2 + \ldots + In + NoB \quad \text{(equation 1)}$$

Where,
S represents the composite received signal that includes both the desired communication signal and the unwanted inband signals
C represents the desired communication signal
I1 represents the first unwanted signal
In represents the nth unwanted signal and
NoB represents the received random noise
As such, we can describe the received carrier-to-noise performance of this signal as $$\text{Carrier-to-noise} = C/(I1 + I2 + \ldots + In + NoB) \quad \text{(equation 2)}$$

Using this invention, the unwanted signal components, I1, I2, ..., In and NoB can be estimated from the received signal S. These estimates can be described as follows
I1*—Estimate of first unwanted signal component
I2*—Estimate of second unwanted signal component
In*—Estimate of nth unwanted signal component
NoB*—Estimate of received random noise
If we use these estimates to cancel the unwanted signal components, then we come up with the following $$\epsilon = I1 - I1^* + I2 - I2^* + \ldots + In - In^* + NoB - NoB^* \quad \text{(equation 3)}$$

Where $\epsilon$ represents the residual error after the cancellation. Using this approach, the received carrier to noise performance of our communication signal can be expressed as $C/\epsilon$, where $\epsilon \ll (I1 + I2 + \ldots + In + NoB)$ if the estimates of the undesirable components are sufficiently close to the actual components themselves.

This novel technique can be used in several different ways to improve the quality of a received communication signal as well as the capacity of a communications channel. In one formulation of this invention, it can be used to improve the effective received carrier-to-noise ratio when a communication signal is received with unwanted random noise, such as statics. By estimating and then removing the noise to within range of the error, $\epsilon$, the received carrier-to-noise ratio can be improved. This aspect of the invention would save power—and therefore energy consumption—by allowing communication signals to be transmitted at lower powers, and still be received with the same quality.

In another aspect of this invention, this technique can be used to remove one or more unwanted interfering signals that are received within the bandwidth of the desired communication signal. By estimating the interfering signals and then removing them to within range of the error, $\epsilon$, the quality of the received communication signal can be improved.

In a third aspect of this invention, it can be used to increase the communication capacity of a channel by allowing two or more communication signals to be transmitted simultaneously in the same bandwidth. In this formulation of the invention, both the desired carrier (C) and an inband interfering signal are communication signals. But, from the point-of-view of the desired carrier (C), the inband signal is an unwanted interferer. However, from the point-of-view of the inband signal (which is itself an desired communication signal), the carrier (C) is an unwanted interferer. The invention can be used to separate out these various communication signals from one another, effectively allowing multiple carriers to simultaneously share the same communications channel, and thereby resulting in a net gain in the capacity of the communications channel. The capacity increase that can be gained using this technique, for a given modulation scheme, can be described as shown in equation 4 below $$Ci = (M-1)^*100\% \quad \text{(equation 4)}$$

Where Ci is the channel capacity improvement and M is the number of overlapped communication signals. For example, two communication signals (M=2) transmitted this way would result in a 100% increase in capacity (i.e., (2−1)*100%).

An advantage of this method is that it does not need a copy of a given unwanted signal in order to remove it and obtain the desired signal.

FIG. 1 shows a system block diagram of a signal remover 100 in accordance with an embodiment of the present invention. As shown in FIG. 1, the input signal S1 denotes the desired communication signal and S2 the unwanted signals which are received simultaneously in the same channel. S1 and S2 can be completely independent, meaning that S2 does not have to be related to S1 in any way such as, for example, when S2 is a modified version of S1.

The signals S1 and S2 may be preprocessed prior to being processed by the signal remover 100. This may include, but not limited to, simultaneously receiving the combined signals S1+S2, and digitizing, filtering and resampling the signals.

In an embodiment of the present invention, S1 and S2 are presumed to be different in someway as, for example, the following:

$P_{s2} < P_{s1}$, where $P_{s1}$ = Received power of S1
$P_{s2}$ = Received power of S2

Using this framework, we now walk through the block diagram of FIG. 1. Starting from the top left, S1 and S2 are received together and input to a first block (102). The processing steps are described in order below:

The signal S1 is demodulated using a processor, such as an adaptive equalizer or a matched filter. FIG. 1 shows an adaptive equalizer 102, but a matched filter, or some other processing scheme, can be used as well. Thus, referring to FIG. 1, the demodulation is performed by the adaptive equalizer 102, a phase lock loop (PLL) 104, a symbol decision block 106 and a symbols-to-bits converter block 108. With the condition that $P_{s2} < P_{s1}$, this demodulation stage will demodulate signal S1 (if the condition were such that $P_{s2} > P_{s1}$, then the demodulated signal would be S2). In some circumstances, the demodulation stage can also demodulate the signal S1 even in the presence of higher power S2 signals. An example of this would be if S2 was only partially overlapping in frequency with S1.

The adaptive equalizer 102 receives the combined signals S1+S2. The adaptive filter coefficients are updated using an adaptive algorithm such as the Least Mean Squared (LMS) error algorithm, which attempts to minimize the feedback signal E from summation block 110. The adaptive filter generates at its output an equalized estimate of S1 symbols. This equalized estimate is applied to a multiplier 112 along with a phase difference signal from the PLL 104 to generate a phase-compensated estimate of S1 symbols at the output of the multiplier 112 (this signal is labeled "Y" in FIG. 1). This phase-compensated estimate of S1 symbols is provided to the symbol decision block 106 which outputs S1 symbols from a symbol map based on the phase-compensated estimate of S1 symbols (the output signal is labeled "D" in FIG. 1). In an embodiment of this invention, the symbol map for the signal S1 can be known in advance or derived from the received signal S1, such as is described in U.S. Pat. No. 7,639,761, the entire contents of which are hereby incorporated by reference.

The output D of the symbol decision block 106 is applied to the symbols-to-bits block 108, to the summation block 110 and to the PLL 104. The summation block 110 determines a difference between each S1 symbol output from the symbol decision block 106 and the corresponding S1 symbol that was input to the symbol decision block 106 to form the feedback signal E which is used to adjust the equalizer parameters. The PLL 104 uses the phased-compensated S1 symbols from the multiplier 112 and the symbols output from the symbol decision block 106 to form the phase correction which is applied to the multiplier 112. Thus, the PLL 104 causes the demodulation stage to lock to the signal S1 by tracking and adjusting the phase offset from the equalizer output. The greater power of S1 results in locking to S1 rather than to S2.

The symbols-to-bits block 108 converts the phase compensated estimate of the symbols (the signal "D") to a S1 output bit stream. This bit stream represents the demodulated estimate of S1 bits.

Error correction can be performed on the demodulated S1 signal to correct some or all of the errors incurred during the demodulation process if forward error correction information is embedded in S1. Referring to FIG. 1, error correction is performed by an error correction block 114. The output of the error correction block 114 is an-error corrected version of the S1 estimate and is different from the demodulated signal in that bit errors are reduced. It should be noted that in an embodiment of this invention, the error correction block 108 may be omitted. Error correction may be omitted where the signal S1 does not include forward error correction information.

The bits are converted into symbols using the symbol map for signal S1. This process is performed by a bits-to-symbols block 116 shown in FIG. 1 and can use the known symbol map, or a symbol map that is derived from the received signal S1, as described above.

Pulse shaping and upsampling can also be performed. The upsampling is used to match the sampling rate of the signal S1 at the input. The input sampling rate should be a multiple of the symbol rate of S1 such as 2 samples/symbol. Referring to FIG. 1, this is performed by an upsample and pulse shape block 118. The pulse shaping applied should match the S1 transmit pulse shaping. The output of this step is an estimate of S1. This estimated signal is denoted as S1*. If the pulse shaping of S1 is unknown, then the pulse shaping step can be omitted. This is because an adaptive filter configured as an adaptive noise canceller 120, discussed below, will also attempt to pulse shape the estimate, S1*, to match that of the input signal S1. Therefore, where the pulse shaping of S1 is known, it can be applied to the estimated signal; otherwise, pulse shaping may be omitted.

The S1* estimate is then input to the adaptive noise canceller block 120. The adaptive noise canceller 120 adaptively cancels the estimate of S1 from the combined received signal S1+S2. The adaptive noise canceller 120 can provide two outputs:

a. The error signal from the adaptive canceller 120, which in this case is an estimate of S2, which is referred to as S2**.
  b. A revised estimate of S1, which is referred to as S1. The adaptive noise canceller 120 generates this revised estimate S1 by attempting to minimize the error 8 which is the difference between S1** and S1.

The signal S1 from the adaptive noise canceller 120 is applied to a summation block 122. The input signals S1+S2 are applied to a delay block 124 and, then, to the summation block 122. The delay block 124 delays the combined input signal (that includes S1 and S2) with respect to the S1 signal output from the noise canceller 120 by an amount of time equal to the time that the signal S1** is delayed so that the signals applied to the summation block 122 are aligned in time.

The summation block 122 determines a difference between the delayed combined signal S1+S2 and the estimated signal S1. This difference is the signal S2. The signal S2 is used as an error signal by the adaptive noise canceller 120 in feedback loop that minimizes S2. Accordingly, the estimate of the unwanted signals, represented by S2**, is removed from the combined received signal S1+S2. The parameters of the adaptive noise canceller can be updated using an adaptive algorithm such as the LMS or other suitable adaptive algorithms.

Since S1 is an estimate of S1, then the relationship between S1 and S1 can be expressed as follows $$S1^{**}=S1+\epsilon \quad \text{(equation 5)}$$

From the block diagram we can then derive that $$S2^{}=(S1+S2)-S1^{} \quad \text{(equation 6)}$$

This can be simplified as follows by substituting equation 5

$$S2^{**}=S1+S2-S1-\epsilon=S2-\epsilon \quad \text{(equation 7)}$$

From equations 5 and 7 we see that the received signal S1+S2 has been separated into estimates S1 and S2 and that the fidelity of the separation is indicated by the error $\epsilon$. Therefore, a composite received signal that includes both a desired communication signal and one or more unwanted inband signals is processed such that the unwanted inband signals are removed from the received signal leaving the desired signal available for further use. Additionally, the removed inband signals are separately available for further use.

Figure 2:
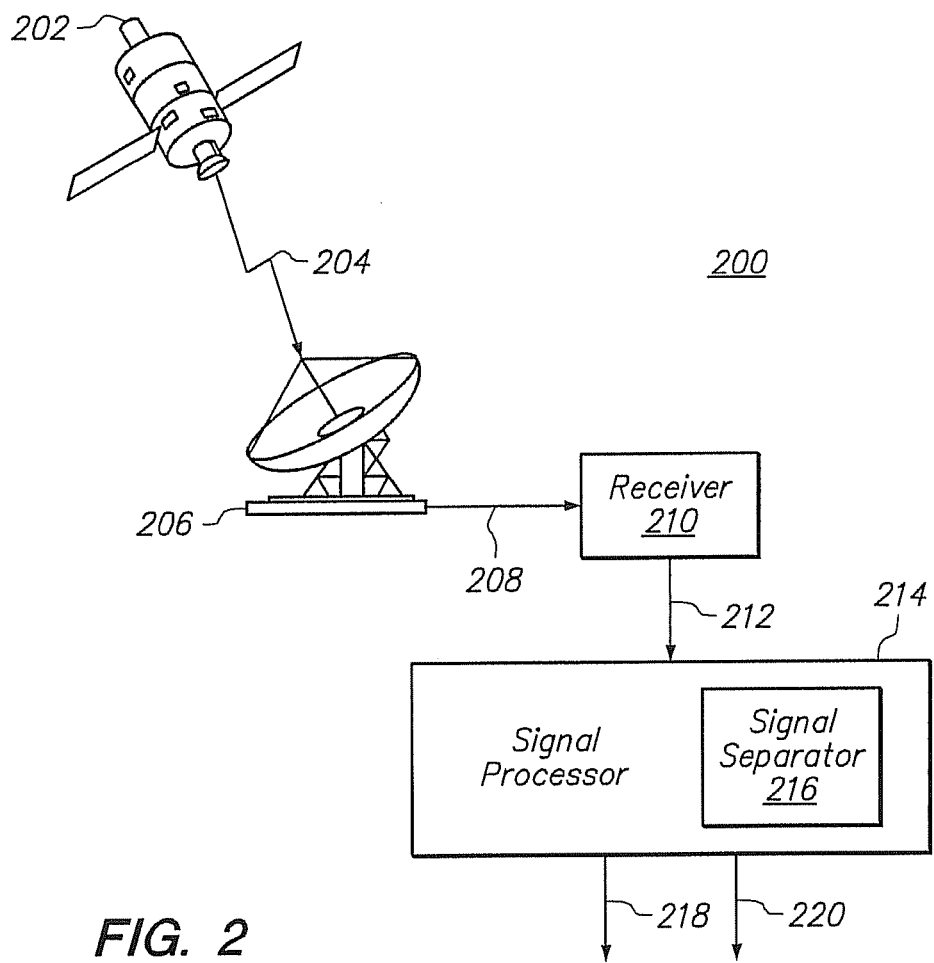
FIG. 2 illustrates a system for receiving and processing a communication signal in accordance with an embodiment of the present invention.

FIG. 2 illustrates system 200 for receiving and processing a communication signal in accordance with an embodiment of the present invention. An example of such a communication system 200 includes a satellite 202 that transmits a signal 204 that is then received by a satellite dish 206. The communication system 200 may include equipment other than the satellite 202 and the satellite dish 206; for example, the communication system may include, but is not limited to, a radio transmitter, a cable transmitter, a cell tower, a microwave transmitter, an optical transmitter; an antenna, a microwave dish, or an optical receiver. The present invention is applicable to any communication system that communicates a communication signal from a transmitter to a receiver, regardless of the medium or the communication signal frequency.

A signal 208 which includes a desired communication signal and unwanted signals is received by a receiver 210. From the receiver 210, a signal 212 is passed to a signal processor 214 which includes an unwanted signal remover 216 (which can be identical to the signal remover 100 in FIG. 1). The signal processor 214 may perform signal processing on the signal in addition to the processing by the unwanted signal remover 216 though this is not necessary. For example, the signal processor 214 may perform preprocessing on the received signal prior to its being processed by the remover 216. A signal 218 output from the signal processor 214 is an estimate of the desired communication signal S1 (which is referred to herein above as the signal S1). Another signal 220 may be output from the remover 216 and signal processor 214. This signal 220 corresponds to the error signal S2 which as discussed above is an estimate of signal S2. The signal 220 may include noise, interference or other unwanted signals.

Either or both of the signals 218 and 220 may be provided to a computer system display so that they can be viewed or input to other equipment that makes use of the output signals 218 and/or 220, such as communications modems. For example, the signals 218 and/or 220 can be processed to determine, and to possibly also display, their properties, such as spectral properties (e.g. their frequency spectrum) or communication parameters (e.g. center frequency or encoding scheme). Therefore, as a further example, the system 200 can be used to detect and extract interference signals for the purpose of signal monitoring. Thus, the output signals 218 and 220 may be further processed to determine their spectral properties which may then be displayed as a spectrum display. The output signals 218 and 220 may also be stored in computer data storage for later use.

The receiver 210 and the signal processor 214 are each implemented with hardware circuits and may also include related software that controls at least a portion of the hardware. While the received signal is being processed by the signal remover 216, at least portions or components of the signal that are being actively processed are at least temporarily stored in the hardware circuitry that performs the signal processing steps. Additionally, the symbol map discussed herein may also be at least temporarily stored in the hardware.

Example 1

S2 as Random Noise

In one formulation of the invention, consider S1 to be the desired communications carrier signal and S2 to be uncorrelated random noise received with the signal. If we follow this scenario through the block diagram we will end up with the following from equations 5 and 7

$$S1 = S1 + \epsilon$$

$$S2^{**} = S2 + \epsilon$$

In this case, however, S2 is random noise. If we replace S2 with the notation N, we get the following $$N^{**} = N + \epsilon \quad \text{(equation 8)}$$

If $\epsilon$ is smaller than N, then we have effectively improved the received carrier-to-noise ratio of S1. From the block diagram, the input is S1+N. which would have a carrier-to-noise ratio of S1/N. From equation 5, the system's output signal is S1+$\epsilon$, resulting in the following cause and effect:

$$\text{If } \epsilon < N, \text{ then } S1/\epsilon > S1/N \quad \text{(equation 9)}$$

From equation 9, we see that the received carrier-to-noise ratio has been improved. The following diagrams show a specific example of how this invention can be used to gain an improvement in the received carrier-to-noise ratio of a communication signal.

Figure 3:
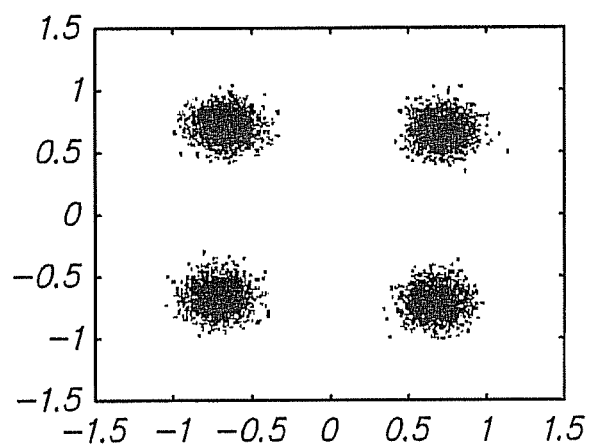
FIG. 3 illustrates a constellation diagram of a received communication signal in accordance with an embodiment of the present invention.
Figure 4:
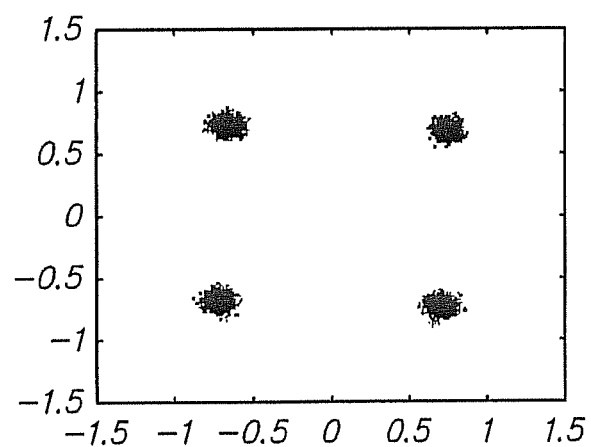
FIG. 4 illustrates a constellation diagram of the signal of FIG. 2 after having been processed in accordance with an embodiment of the present invention.

FIG. 3 shows a constellation diagram of a received QPSK communications carrier signal with a received carrier-to-noise ratio of approximately 17 dB. Thus, FIG. 3 shows a received signal which can be represented as S1+N. FIG. 4 shows a constellation display of the output signal, S1+$\epsilon$, after running this signal though the processing steps of this invention. The output signal can be represented as S1 where S1=S1+$\epsilon$. Qualitatively, it is easy to see that the receive performance has been improved. In this particular case, $\epsilon$ is 7 dB smaller than N, and therefore the received carrier-to-noise ratio was improved to 24 dB. For this particular example, S1 does not include any forward error correction information and therefore the demonstrated cancellation gain is somewhat conservative.

Example 2

S2 as an Unwanted Interfering Signal

In a second formulation of this invention, consider S1 to be our encoded communications carrier signal and S2 to be an unwanted interference signal. From the input, we know that the received carrier-to-noise ratio of S1 will be limited by the interfering signal S2 and will be no better than S1/S2. From equation 5, we know that after the cancellation process, $$S1^{**} = S1 + \epsilon$$

To illustrate the invention under this scenario, we have used the same communications carrier signal S1 which was used in Example 1 (a QPSK carrier with a baseline performance of 17 dB—without S2 present). For S2, we have injected an interferer which is a communications carrier that is also QPSK. S2 has a bandwidth that is similar to S1 and is fully overlapping in frequency with S1. The total power of carrier S1 is greater than the total power of the interfering signal S2.

Figure 5:
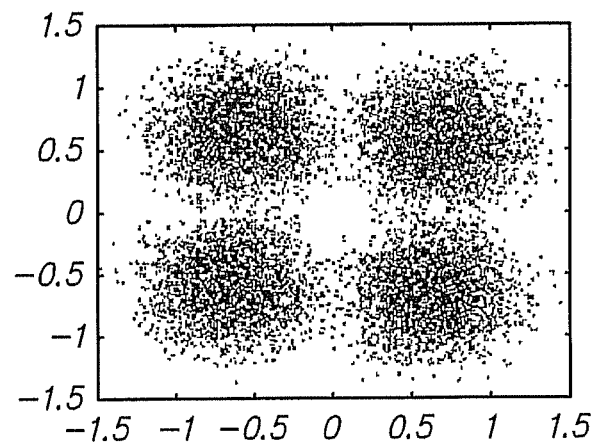
FIG. 5 illustrates a constellation diagram of a received communication signal along with an unwanted signal in accordance with an embodiment of the present invention.
Figure 6:
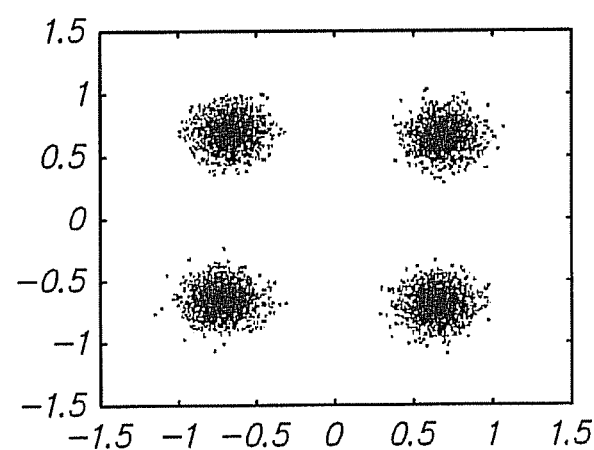
FIG. 6 illustrates a constellation diagram of the signal of FIG. 5 after having been processed in accordance with an embodiment of the present invention.

FIGS. 5 and 6 show the received performance of S1 before and after running through the system. More specifically, FIG. 5 illustrates the receive performance of S1 with S2 present. FIG. 5 illustrates the receive performance of S1 after S2 has been removed using this invention. The output signal can be represented as S1 where S1=S1+$\epsilon$. Intuitively, it is easy to see the performance improvement. Under this scenario, the received carrier-to-noise performance of our estimate, S1**, is within ½ dB of the baseline case, meaning that the degradation of S1 due to S2 has almost been completely irradicated. For this example, S1 does not include any forward error correction information. With forward error correction, the demonstrated performance gain should be even better.

Example 3

S2 as Another Communications Carrier

In a third formulation of this invention, consider both S1 and S2 to be planned communications carriers. From equation 5 and 7 we know that S1 and S2 will be separated and output as follows.

$$S1^{**} = S1 + \epsilon$$

$$S2^{**} = S + \epsilon$$

Under this scenario, S1 and S2 are both communication signals that are overlapping in both frequency and time. Both are desired communication signals in their own right. However, each also appears to be an unwanted interferer to the other (as in Example 2). In practice, by transmitting S1 and S2 this way, an improvement in capacity can be gained. For example, consider the previous example where two QPSK carriers are transmitting in the same bandwidth. If S1 and S2 are separated to within an acceptable error, $\epsilon$, then twice the amount of information can be transmitted over the same channel. In essence, the capacity of the channel is doubled by this invention.

In the case where the invention is being used to improve channel capacity, the separation process described herein can be run recursively to separate more than two carriers. For example, assume that S2 represents two distinct communications signals. After the first pass of signal separation, the output would be as in equation 7. If this output is then fed back into the input of the block diagram shown in FIG. 1 (which may be performed by the same hardware or by duplicate hardware), this process can be repeated to separate S2 into the two distinct signals. Thus, this invention can be used to recursively separate multiple desired communication signals that are overlapping in frequency and time. When applied this way, the invention can improve the channel capacity for a given modulation scheme as shown in equation 4.

Figure 7:
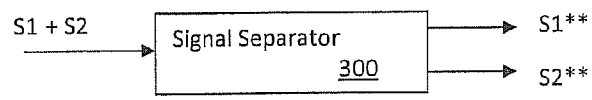
FIG. 7 illustrates an inband signal separator in accordance with an embodiment of the present invention.

FIG. 7 illustrates an inband signal separator 300 in accordance with an embodiment of the present invention. The signal separator 300 shown in FIG. 7 can be identical to the signal remover 100 shown in FIG. 1. As shown in FIG. 7, the signal separator 300 receives the combined signals S1+S2 and forms an estimate S1 of the communication signal S1 and an estimate S2 of any inband signals S2.

Figure 8:
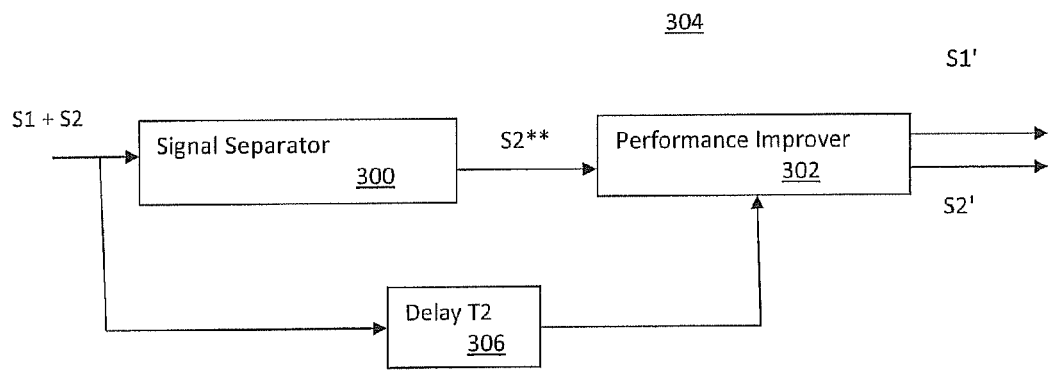
FIG. 8 illustrates a block diagram of an enhanced signal separator in accordance with an embodiment of the present invention.

FIG. 8 illustrates a block diagram of an enhanced signal separator 304 in accordance with an embodiment of the present invention. As shown in FIG. 8, the estimate S2** formed by the signal separator 300 is input to a performance improver 302. The combined signals S1+S2 are delayed by a delay block 306 and the delayed combined signals S1+S2 are also input to the performance improver 302. The performance improver 302 forms an improved estimate S1' of the communication signal S1 and an improved estimate S2' of the inband signal S2.

Using the estimate of the inband signal S2, the performance improver 302 performs a second stage of processing to cancel this estimate, S2, from the received composite signal, S1+S2. The improvement to the invention can provide a significant bit error rate (BER) improvement. For example, this improvement has shown to improve the bit error rate BER of the desired communication signal S1 by over 50 dB (by improving receive BER from 10-3 to 10-8).

Figure 9:
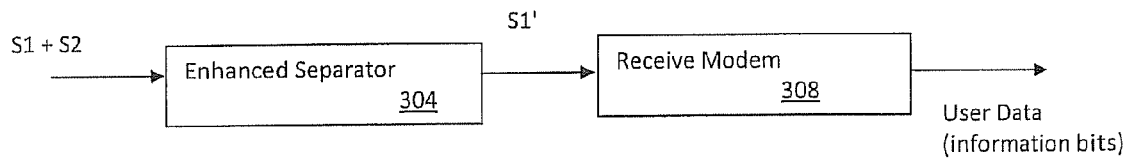
FIG. 9 illustrates a system employing the enhanced signal separator in conjunction with a signal demodulator in accordance with an embodiment of the present invention.

FIG. 9 illustrates a system employing the enhanced signal separator 304 in conjunction with a signal demodulator 306 (e.g. a modem) in accordance with an embodiment of the present invention As shown in FIG. 9, the enhanced signal separator 304 can be utilized to pre-process communication signals that are degraded by interference before being received by a demodulator 308.

As shown in FIG. 9, communication signal S1 is degraded with inband interference S2. If this composite signal (S1+S2) is input directly to a receive modem, the bit error rate may be seriously degraded due to the loss of performance caused by the inband interference S2. The BER will be degraded because the modem will receive S1 with a performance of S1/(N+S2). This is commonly referred to as the carrier power-to-noise+interference ratio. For example, if the power of S2 is equal to the power of the noise, N, then the receive performance of S1 will be degraded by 3 dB.

However, if the composite signal (S1+S2) is processed by the enhanced separator 304, as shown in FIG. 9, then the receive performance of S1 will be S1/(N+S2−S2). If the estimate of S2 is close to S2, then the receive performance of S1 can approach S1/N, which is the performance that would be observed without the presence of the inband signal S2.

If estimate S2 produced by the signal separator 300 is defined as S2+e where e is the difference between S2 and S2, then the performance of the received signal will be S1/(N+e). As e approaches zero, the received performance will approach S1/N, which is the same performance that would be achieved without the inband signal S2.

The bit error rate (BER) of S1 will decrease as the carrier power-to-noise+interference ratio increases. If the interference power, represented by S2, can be significantly reduced, then the resulting BER of S1 can be dramatically lower.

Figure 10:
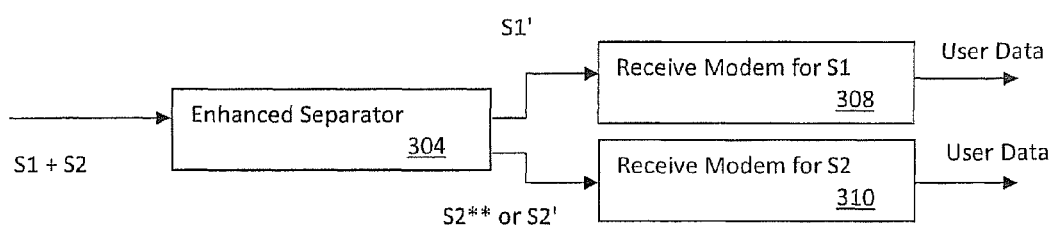
FIG. 10 illustrates a system employing the enhanced signal separator in conjunction with two signal demodulators in accordance with an embodiment of the present invention.

FIG. 10 shows a second application for the enhanced signal separator 304 in accordance with an embodiment of the present invention. Specifically, FIG. 10 illustrates a system employing the enhanced signal separator 304 in conjunction with two signal demodulators 308, 310. This configuration can be utilized when the inband signal S2 is another desired communication signal. Thus, rather than cancel this signal, the system can output both the improved version of S1 as well as one of the estimates of S2 (S2** or S2'). An advantage of this configuration is that two signals or more can be transmitted in the same bandwidth, which increases the transmit capacity of a given amount of bandwidth.

Figure 11:
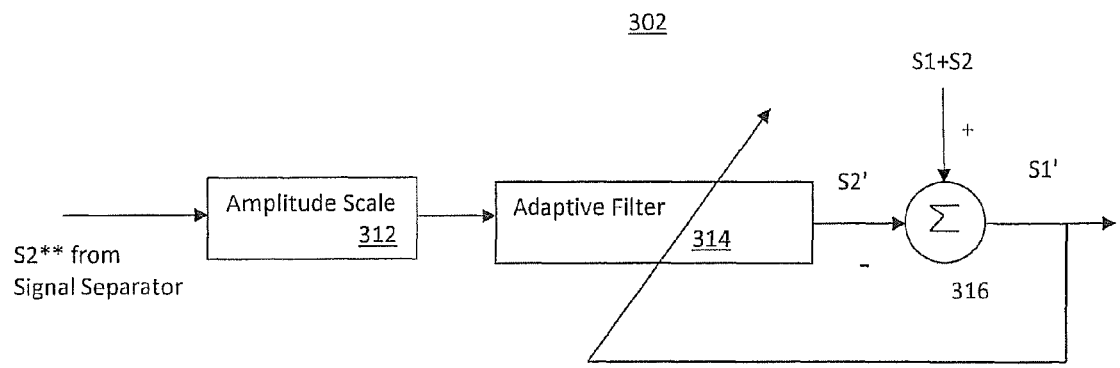
FIG. 11 illustrates a block diagram of a performance improver in accordance with an embodiment of the present invention.

FIG. 11 illustrates a block diagram of a performance improver 302 in accordance with an embodiment of the present invention. As shown in FIG. 11, the signal S2** is input from the signal separator block 300 and is scaled in amplitude by amplitude scaling block 312 before being input to an adaptive filter 314 configured to perform noise cancellation. The output, S2', of the adaptive filter 314 is subtracted from the composite input signal, S1+S2, by summation block 316. As before, S1 is the desired communication signal and S2 is an interfering signal. Filter taps of the adaptive filter 314 are adjusted to minimize the difference output of the summation block 316. In this case, the minimum difference will be the desired communication signal S1 and will be achieved when the output of the adaptive filter 314, S2', exactly matches S2. In general, S2' will be equal to S2+e and the resulting output S1' of the performance improver block 302 will be equal to S1−e. If e is much smaller than S2, then the resulting carrier power-to-noise+interference ratio will be greater than otherwise and the resulting BER will be lower. The parameters of the adaptive filter can be updated using an adaptive algorithm such as the LMS or other suitable adaptive algorithms.

As described herein, the signal separators 100 and 300 shown in FIGS. 1 and 7, respectively, separate inband signals from a received composite signal S1+S2 to form an estimate S1 of the communication signal S1 and an estimate S2 of the inband signal(s) S2. The inband signal estimate S2** can be removed from the composite input signal resulting in a significant improvement in the communication signals received BER.

Figure 12:
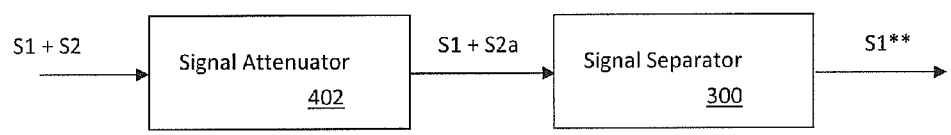
FIG. 12 illustrates a block diagram of an enhanced signal separator in accordance with an alternative embodiment of the present invention.

FIG. 12 illustrates a block diagram of an enhanced signal separator 400 in accordance with an alternative embodiment of the present invention As shown in FIG. 12, a signal attenuator 402 is configured to receive the composite signal S1+S2. The signal attenuator 402 significantly attenuates high power interfering signals prior to processing by the signal separator 300. As shown in FIG. 12, the signal attenuator 402 outputs the communication signal S1 and an attenuated version of S2, denoted as S2a. The composite output is denoted as S1+S2a and is passed to the signal separator 300 where S2a can be removed from S1, as described herein. By combining the signal attenuator 402 with the signal separator 300, common high power interfering signals, often referred to as jamming signals, can be effectively removed from the pass-band of the communication signal S1, allowing the communication signal S1 to be successfully received even in a hostile signal environment. The signal attenuator 402 can effectively attenuate stationary CW (continuous wave) tones, sweeping CW signals, hopping CW signals as well as multiple combinations of these interfering signals, commonly referred to as barrage interference or jamming.

In many cases, the signal attenuator 402 will not be able to sufficiently attenuate the jamming signal to restore the reception quality of the communication signal S1 by itself. In other words, the attenuated interfering signal, denoted as S2a, may be significantly attenuated, but the resulting power of S2a may still be too large to significantly improve the receive quality of S1. However, by combining the signal attenuator 402 with the signal separator 300, the receive quality of S1 can be dramatically improved even when the power of S2a is still quite large.

For example, if S1 is interfered with by a high power sweeping signal S2, the receive performance of S1 can be expressed as (S1/N+S2), where S1 is the communication signal, N is noise and S2 is the high power interfering signal. In many jamming scenarios, this ratio will be less than one, meaning the interferer S2 is stronger in power than the communication signal S1. By using the signal attenuator 402 along with the signal separator 300, the receive performance of S1 will be improved in two stages. At the output of the signal attenuator 402, the receive performance of S1 can be expressed as (S1/N+S2a), where (S1/N+S2a)<<(S1/N+S2). It should be noted that the signal attenuator 402 can often achieve attenuations exceeding 20 dB. At the output of the signal separator 300, as shown previously, the resulting performance will be (S1/N+e), where (S1/N+e)<<(S1/N+S2a). As described herein, if e is close to zero, the resulting receive performance of S1 can be equivalent to S1/N, which is the receive performance that would be achieved without the jamming signal. In other words, by combining the signal attenuator 402, which is capable of attenuating high power signals, with the signal separator 300, S1 can be received with near ideal performance even though it is actively being jammed with the high power signal S2.

Figure 13:
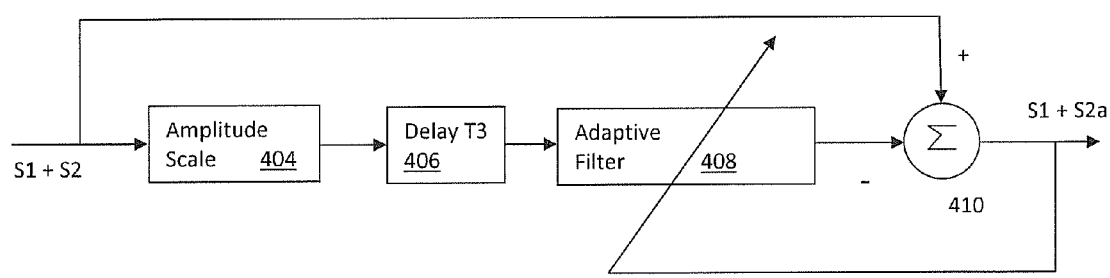
FIG. 13 illustrates a block diagram of a signal attenuator in accordance with an embodiment of the present invention.

FIG. 13 illustrates a block diagram of a signal attenuator 402 in accordance with an embodiment of the present invention. As shown in FIG. 13, the composite signal S1+S2 is routed via two paths. In a first path, the composite signal S1+S2 is scaled in amplitude by amplitude scaling block 404 and delayed a time period by a delay block 406 before being input to an adaptive filter 408. The adaptive filter 408 is configured to perform noise cancellation. In a second path, the composite signal S1+S2 is routed to a summation block 410. The output of the adaptive filter 408 is subtracted from the composite input signal S1+S2 by the summation block 410 to form the signal S1+S2a. The signal S1+S2a is used to update the weights of the adaptive filter 408 to minimize the difference output of the summation block 410.

The parameters of the adaptive filter 408 can be updated using an adaptive algorithm such as the LMS or other suitable adaptive algorithms. A normalized version of the LMS algorithm is a preferred approach as this allows the algorithm to better perform due to the potential large changes in power from signal S2. For example, if S2 is sweeping or hopping, the power change can be very large as it moves in and out of the bandwidth of S1.

So that S2 of the composite signal S1+S2 is sufficiently attenuated by the adaptive filter 408 and S1 is not significantly affected, the following criteria should be met:
S1 is not correlated with a delayed version of itself; and
S2 is correlated with a delayed version of itself.

Although the above criteria may seem constraining, it is in practice generally met. This is because S1 is a communication signal that is not periodic as it contains a bit stream that is highly randomized by the source modulator. For S2 to be correlated with a delayed version of itself, it must be either periodic or its amplitude must change in time more slowly than S1. These criteria are met for the signal types identified herein, including stationary CW (continuous wave) tones, sweeping CW signals, hopping CW signals as well as multiple combinations of these interfering signals, commonly referred to as barrage interference or jamming.

So long as the signals meet the criteria described above, the adaptive filter 408 will adjust to minimize the error (which is also the output). Since S1 is not correlated with a delayed version of itself, only S2 will be attenuated. The minimum will be approached as the power of S2 is reduced. The amount of attenuation is a function of the number of taps used in the adaptive filter 408 and the input scale factor which is typically set to a value between 0 and 1.

For high power, fast moving signals, a significant amount of power from S2 may remain after attenuation. This could be a problem if the signal attenuator 402 was used alone. However, so long as S2 is sufficiently attenuated, the residual S2 component, referred to as S2a, can be readily removed by the signal separator 300, as shown in FIG. 12. The signal separator 300 generally requires that the aggregate power of the inband signal or signals be less than the power of the desired communications signal to achieve effective removal. The signal attenuator 402 can reduce the power of the interfering signals that would otherwise be greater than that of the communication signal to a level that is lower than that of the communications signal. Therefore, by combining the signal separator 300 with the signal attenuator 402, removal of certain types of interfering signals that have higher power than the communication signal is possible.

The enhanced separator 304 shown in FIG. 8 can be used in conjunction with the signal attenuator shown in FIGS. 12 and 13.

The description above illustrates operation of embodiments of the invention and is not meant to limit the scope of the invention. It will be apparent to one skilled in the relevant art that variations will be encompassed by the spirit and scope of the invention and that the invention may be practiced in other embodiments. The system described herein may be implemented via a combination of hardware and software or entirely in hardware elements. Also, the particular division of functionality between the various system components described herein is merely exemplary. Thus, the methods and operations presented herein are not inherently related to any particular computer or other apparatus. Functions performed by a single system component may instead be performed by multiple components, and functions performed by multiple components may instead performed by a single component. It will also be apparent that process steps described herein can be embodied in software, firmware or hardware. Thus, the present invention or portions thereof may be implemented by apparatus for performing the operations herein. This apparatus may be specially constructed or configured, such as application specific integrated circuits (ASICs) or Field Programmable Gate Arrays (FPGAs), as a part of an ASIC, as a part of FPGA, or it may comprise a general-purpose computer selectively activated or reconfigured by a computer program stored on a computer readable medium that can be accessed and executed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, or any type of media suitable for storing electronic instructions, and or coupled to a computer system bus. Furthermore, the methods described in the specification may be implemented by a single processor or be implemented in architectures employing multiple processor designs for increased computing capability. Accordingly, the disclosure of the present invention is intended to be illustrative, but not limiting, of the scope of the invention.

What is claimed is:

1. A system for removing one or more unwanted inband signals from a received communication signal comprising:
    a signal attenuator configured to receive a composite signal that includes a desired communication signal and one or more unwanted inband signals, wherein the signal attenuator is configured to selectively attenuate the one or more unwanted inband signals to form a modified received signal that includes the desired communication signal and the attenuated inband signals and further wherein the signal attentuator is configured to selectively attenuate the unwanted inband signals based on the unwanted inband signals being correlated with a delayed version of the unwanted inband signals; and
    a signal separator configured to process the modified received signal to form an estimate of the desired communication signal and an estimate of the attenuated inband signals, wherein the signal separator performs adaptive noise cancellation on the modified received signal using the estimate of the desired communication signal to form the estimate of the one or more unwanted inband signals.

2. The system according to claim 1, wherein the power of the desired received communication signal is greater than the aggregate received power of the attenuated inband signals and the signal separator uses the greater power of the desired communication signal to lock to the desired communication signal.

3. The system according to claim 2, wherein the power of the desired received communication signal is lower than the aggregate received power of the inband signals.

4. The system according to claim 2, wherein the signal separator is configured to demodulate the modified received signal to form a demodulated signal and wherein the signal separator is configured to remodulate the demodulated signal to form the estimate of the desired communication signal.

5. The system according to claim 4, wherein the signal separator uses the greater power of the desired communication signal to lock to the desired communication signal so as to form the demodulated signal.

6. The system according to claim 1, wherein the signal attenuator is configured to avoid attenuating the desired communication signal based on the desired communication signal being not correlated with a delayed version of the desired communication signal.

7. The system according to claim 1, wherein the signal attentuator is configured to selectively attenuate the unwanted inband signals based on the unwanted inband signals being periodic or having amplitudes that change in time more slowly than that of the desired communication signal.

8. The system according to claim 1, wherein the signal attentuator comprises an adaptive filter wherein the adaptive filter is configured to a receive a delayed version of the composite signal and wherein an output of the adaptive filter is subtracted from the composite signal to form the modified received signal.

9. The system according to claim 8, wherein the signal attenuator is further configured to perform amplitude scaling on the composite signal.

10. The system according to claim 1, wherein the signal separator forms the estimate of the desired communication signal and the estimate of the attenuated inband signals without prior knowledge of characteristics of the unwanted inband signals and without obtaining a copy of any of the unwanted inband signals.

11. The system according to claim 1, wherein the signal separator forms the estimate of the desired communication signal and the estimate of the attenuated inband signals using only the modified received signal as input.

12. The system according to claim 1, wherein the signal separator at least temporarily stores a portion of the modified received signal during processing of the modified received signal.

13. The system according to claim 1, wherein the system is configured to process the estimate of the one or more attenuated inband signals to determine their properties.

14. The system according to claim 13, wherein the properties comprise spectral properties.

15. The system according to claim 13, wherein the system is configured to display properties of the one or more attenuated inband signals.

16. The system according to claim 1, wherein the signal separator comprises an adaptive equalizer that is used to demodulate the received signal to form a demodulated signal.

17. The system according to claim 1, wherein the signal separator comprises a matched filter that is used to demodulate the received signal to form the demodulated signal.

18. The system according to claim 1, wherein the desired communication signal includes forward error correction information and the signal separator performs forward error correction on the estimate of the desired communication signal.

19. The system according to claim 1, wherein the one or more unwanted inband signals comprise random noise.

20. The system according to claim 1, wherein the one or more unwanted inband signals comprises an interfering signal having a source that is independent from that of the desired communication signal.

21. A method of removing one or more unwanted inband signals from a received communication signal comprising:
    obtaining a received composite signal, the received composite signal including a desired communication signal and one or more unwanted inband signals;
    processing the received composite signal using a signal attenuator, wherein the signal attenuator selectively attenuates the one or more unwanted inband signals based on the unwanted inband signals being correlated with a delayed version of the unwanted inband signals to form a modified received signal that includes the desired communication signal and the one or more attenuated inband signals; and
    processing the modified received signal using a signal separator to form an estimate of the desired communication signal and an estimate of the one or more attenuated inband signals, wherein the signal processor performs adaptive noise cancellation on the modified received signal using the estimate of the desired communication signal to form the estimate of the one or more attenuated inband signals.

22. A non-transitory computer readable media having stored thereon computer code which when executed by a processor causes the processor to perform a method of removing one or more unwanted inband signals from a received communication signal comprising:
  obtaining a received composite signal, the received composite signal including a desired communication signal and one or more unwanted inband signals;
  processing the received composite signal using a signal attenuator, wherein the signal attenuator selectively attenuates the one or more unwanted inband signals based on the unwanted inband signals being correlated with a delayed version of the unwanted inband signals to form a modified received signal that includes the desired communication signal and the one or more attenuated inband signals; and
  processing the modified received signal using a signal separator to form an estimate of the desired communication signal and an estimate of the one or more attenuated inband signals, wherein the signal processor performs adaptive noise cancellation on the modified received signal using the estimate of the desired communication signal to form the estimate of the one or more attenuated inband signals.

23. A system for removing one or more unwanted inband signals from a received communication signal comprising:
  a signal attenuator configured to receive a composite signal that includes a desired communication signal and one or more unwanted inband signals, wherein the signal attenuator is configured to selectively attenuate the one or more unwanted inband signals to form a modified received signal that includes the desired communication signal and the one or more attenuated inband signals; and
  a signal separator configured to process the modified received signal to form an estimate of the desired communication signal and an estimate of the attenuated inband signals, wherein the signal separator performs adaptive noise cancellation on the modified received signal using the estimate of the desired communication signal to form the estimate of the one or more attenuated inband signals, and wherein the signal separator forms the estimate of the desired communication signal and the estimate of the one or more attenuated inband signals using only the modified received signal as input.

24. The system according to claim 23, wherein the power of the desired received communication signal is greater than the aggregate received power of the attenuated inband signals and the signal separator uses the greater power of the desired communication signal to lock to the desired communication signal.

25. The system according to claim 23, wherein the signal separator is configured to demodulate the modified received signal to form a demodulated signal and wherein the signal separator is configured to remodulate the demodulated signal to form the estimate of the desired communication signal.

26. The system according to claim 23, wherein the signal attenuator is configured to selectively attenuate the unwanted inband signals based on the unwanted inband signals being periodic or having amplitudes that change in time more slowly than that of the desired communication signal.

27. The system according to claim 23, wherein the signal attenuator comprises an adaptive filter wherein the adaptive filter is configured to a receive a delayed version of the composite signal and wherein an output of the adaptive filter is subtracted from the composite signal to form the modified received signal.

28. The system according to claim 23, wherein the system is configured to process the estimate of the attenuated inband signals to determine their properties.

29. The system according to claim 23, wherein the signal separator comprises an adaptive equalizer that is used to demodulate the received signal to form a demodulated signal or a matched filter that is used to demodulate the received signal to form the demodulated signal.

30. A method of removing one or more unwanted inband signals from a received communication signal comprising:
  obtaining a received composite signal, the received composite signal including a desired communication signal and one or more unwanted inband signals;
  processing the received composite signal using a signal attenuator, wherein the signal attenuator selectively attenuates the one or more unwanted inband signals to form a modified received signal that includes the desired communication signal and the one or more attenuated inband signals; and
  processing the modified received signal using a signal separator to form an estimate of the desired communication signal and an estimate of the one or more attenuated inband signals, wherein the signal processor performs adaptive noise cancellation on the modified received signal using the estimate of the desired communication signal to form the estimate of the one or more attenuated inband signals and wherein the signal separator forms the estimate of the desired communication signal and the estimate of the one or more attenuated inband signals using only the modified received signal as input.

* * * * *